(12) United States Patent
Henon

(10) Patent No.: US 6,741,577 B1
(45) Date of Patent: May 25, 2004

(54) INTER-FREQUENCY HANDOVER IN WIRELESS CDMA SYSTEMS

(75) Inventor: Alexandre Henon, Newark, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/450,231

(22) Filed: Nov. 29, 1999

(51) Int. Cl.[7] .............................................. H04B 7/216
(52) U.S. Cl. ...................................... 370/331; 370/335
(58) Field of Search ............................. 370/328, 329, 370/331, 332, 333, 334, 335, 342

(56) References Cited

U.S. PATENT DOCUMENTS

| | | | |
|---|---|---|---|
| 5,533,014 A | * 7/1996 | Willars et al. | 370/335 |
| 6,233,231 B1 | * 5/2001 | Felix et al. | 370/335 |
| 6,339,646 B1 | * 1/2002 | Dahlman et al. | 380/273 |

FOREIGN PATENT DOCUMENTS

| | | | | |
|---|---|---|---|---|
| EP | 0668669 A1 | 8/1995 | ............ | H04B/7/26 |
| EP | 0868093 A1 | 9/1998 | ............ | H04Q/1/00 |
| EP | 0876008 A1 | 11/1998 | ............ | H04B/7/26 |
| GB | 2313254 A | 11/1997 | ............ | H04B/7/005 |

OTHER PUBLICATIONS

By A Baier et al. "Multirate DS–CDMA Radio Interface for Third–Generation Cellular System", Seventh IEE European Conference on Mobile and Personal Communications, Dec., 13–15, 1993, pp. 255–260.

* cited by examiner

Primary Examiner—Kwang Bin Yao
(74) Attorney, Agent, or Firm—Dicran Halajian

(57) ABSTRACT

In a method for inter-frequency handover of a mobile station from forward and reverse links with a current base station of a wireless cellular system to new forward and reverse links usually with a new base station utilizing a CDMA modulation type, dropped calls are substantially eliminated by increasing spreading factor during the handover. Thus, a handover command is sent from the current base station to the mobile station which identifies a new operating frequency, a final spreading factor, and a starting spreading factor which is at least double, and preferably at least four times, the final spreading factor. The mobile station switches its operating frequency in accordance with the identified new operating frequency, and establishes new forward and reverse links from the mobile station at the new operating frequency and the identified starting spreading factor with the new base station. The mobile station then signals the new base station that the handover is complete and the frame number of the detected frame. The new base station and the mobile station switch to the final spreading factor a predetermined number of frames after this frame number.

8 Claims, 3 Drawing Sheets

INTER-FREQUENCY HANDOVER IN WIRELESS CDMA SYSTEMS

BACKGROUND OF THE INVENTION

1. Field of the Invention

The present invention relates to a handover in or between wireless cellular or personal communications Code Division Multiple Access (CDMA) systems wherein a mobile station is switched or transferred from one set of forward and reverse communication links to another. In its particular aspects, the present invention relates to a handover which at least requires the mobile station to change its operating frequency, referred to herein as an "inter-frequency handover".

2. Description of the Related Art

A method for such a handover is known from A. Baier et al., "MULTI-RATE DS-CDMA RADIO INTERFACE FOR THIRD-GENERATION CELLULAR SYSTEMS", Seventh IEE European Conference on Mobile and Personal Communications, 13–15 December 1993, pp. 255–260.

Handovers are employed in wireless cellular and personal communications systems to allow mobile stations to travel from the coverage area of one base station to another while maintaining a call. While handovers are usually employed to transfer an ongoing communication with the mobile station from a current to a new base station, it is also possible to hand over a communication with the mobile station from one set of forward and reverse links to another of the same base station.

In a CDMA system a handover of a mobile station between base stations can be either a soft handover, in which during a transient period the mobile station simultaneously maintains forward and reverse links with both the current and new base stations, generally at the same frequency, and receives the same data via both base stations, and a hard handover, where the mobile station switches from current links to new links generally at a new frequency and/or of a new network without such a transient period in which current and new forward and reverse links are simultaneously maintained.

Unfortunately, inter-frequency handovers are subject to dropped calls causing annoyance and inconvenience to the parties to the dropped calls.

One method of improving the reliability of an inter-frequency handover is to use a transient compressed mode in which the data transmitted to the current base station at the current frequency F1 is squeezed into the first halves of frames by doubling the instantaneous symbol rate $R_{INFO}$ while allowing the mobile station to tune to and establish communication at the new frequency F2 in the second halves of frames. While the compressed mode allows for a more gradual inter-frequency handover similar to a soft handover, there may be a deterioration of the bit error (BER) during the time that this mode is employed due to the doubling of the instantaneous symbol rate. Since the chip rate $R_{CHIP}$ of the Pseudo Noise (PN) spreading code is held constant, the doubling of the symbol rate $R_{INFO}$ results in a halving of the spreading factor $R_{CHIP}/R_{INFO}$ in each half of the frame. To prevent the bit error rate BER from increasing due to this halving of the spreading factor, the power level of transmissions in compressed mode is increased accordingly. However, it is not always possible to sufficiently further increase the power level of transmission, e.g. when the power level of the mobile station is already at or near its maximum radiated power. Under such circumstances, the compressed mode may also cause a dropped call.

OBJECTS AND SUMMARY OF THE INVENTION

It is an object of the present invention to reduce the occurrence of dropped calls as a result of inter-frequency handover in CDMA wireless cellular and personal communication systems, as an alternative to increasing transmission power during the handover, and also where it is not possible to sufficiently increase the transmission power during the handover.

The present invention is based on the insight that to substantially obviate a high risk of a dropped call during an inter-frequency handover, the BER should in fact be significantly reduced (rather than merely maintained) by increasing the spreading factor of transmissions to and from the mobile station.

Thus, a handover method in accordance with the present invention with respect to acts occurring at, or from the point of view of, the mobile station is characterized in that in response to a handover command from the current base station identifying a new operating frequency different from the current operating frequency, a final spreading factor, and a starting spreading factor which is at least double the final spreading factor, the operating frequency of the mobile station is switched in accordance with the identified new operating frequency, the mobile station transmits during a transient period at the identified starting spreading factor, forward and reverse links from the mobile station at the new operating frequency are established by the end of the transient period, and the mobile station communicates over the established new links at the identified final spreading factor after the end of the transient period. Also, an apparatus comprising a programmed microprocessor or controller for a mobile station in accordance with the present invention is characterized in that it is programmed to steer the foregoing acts in response to an inter-frequency handover command.

Further, in accordance with the present invention, a method with respect to acts occurring at, or from the point of view of, the current base station is characterized in that the current base station transmits to the mobile station a handover command identifying a new operating frequency different from the current operating frequency, a final spreading factor, and a starting spreading factor which is at least double the final spreading factor.

The methods and apparatus of the present invention are additionally characterized in that the starting spreading factor is at least four times the final spreading factor. Another aspect of the present invention is that the transient period is of a predetermined fixed duration.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1:
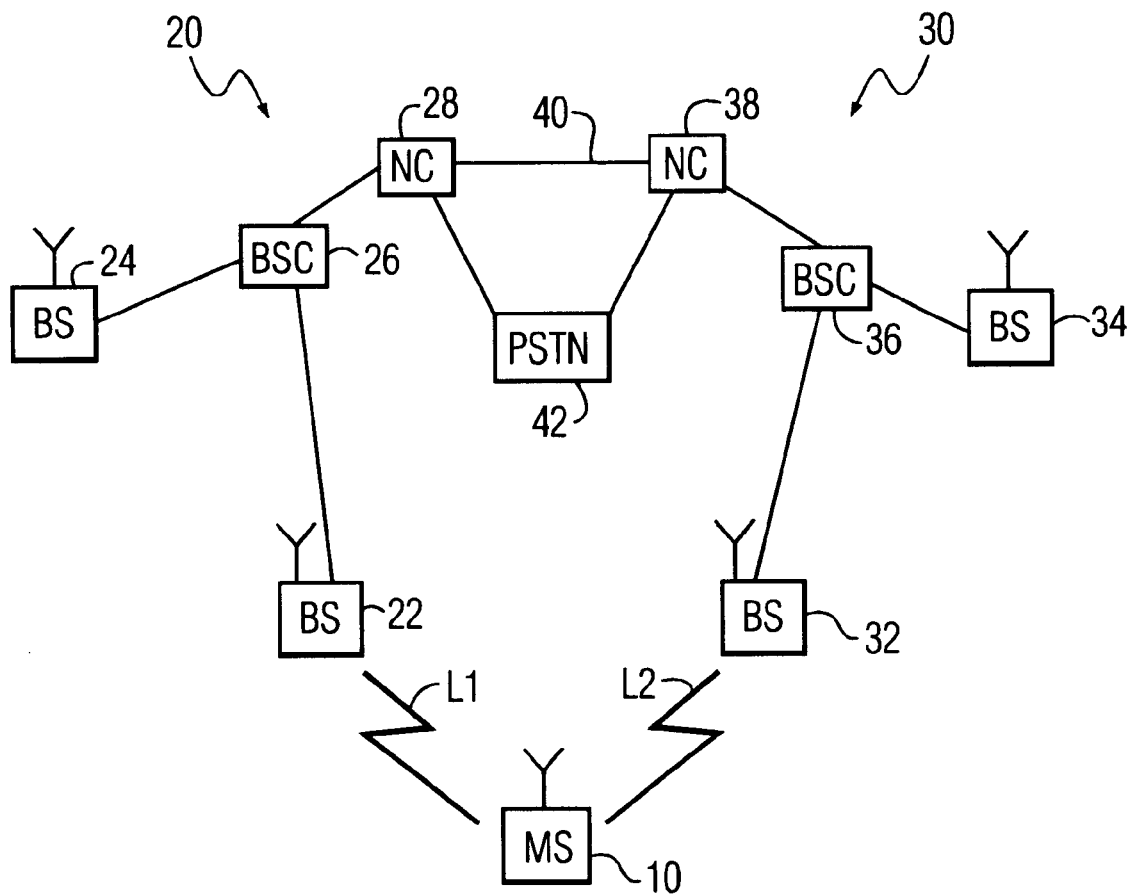
FIG. 1 schematically shows a mobile station in conjunction with a pair of wireless cellular networks.

Referring first to FIG. 1, there is shown a mobile station 10, which is capable of roaming, while on a call, from the wireless coverage area of a first base station 22 of a Direct Sequence Code Division Multiple Access (DS-CDMA) network 20 to the wireless coverage of a second base station 32, which may be of the same network, or of a different DS-CDMA different network 30 as illustrated, such that an "inter-frequency" handover is required. By this is meant that the call must be switched or transferred from a set of forward and reverse links L1 of mobile station 10 with base station 22 of network 20, which is at an operating frequency F1, to a set of forward and reverse links L2 of mobile station 10 with base station 32 of network 30, which is at an operating frequency F2. At the level of detail shown in FIG. 1, the networks 20 and 30 are conventional For purposes of illustration the network 20 is shown as comprising two base stations 22, 24, a base station controller 26 which controls the plurality of base stations 22, 24, and a network controller 28 which controls network 20. Similarly, network 30 is shown as comprising two base stations 32, 34, a base station controller 36 which controls the plurality of base stations 32, 34, and a network controller 38 which controls network 20. The network controllers are coupled by a communication link 40, and also each network controller is coupled to the public switched telephone network (PSTN) 42.

Figure 2:
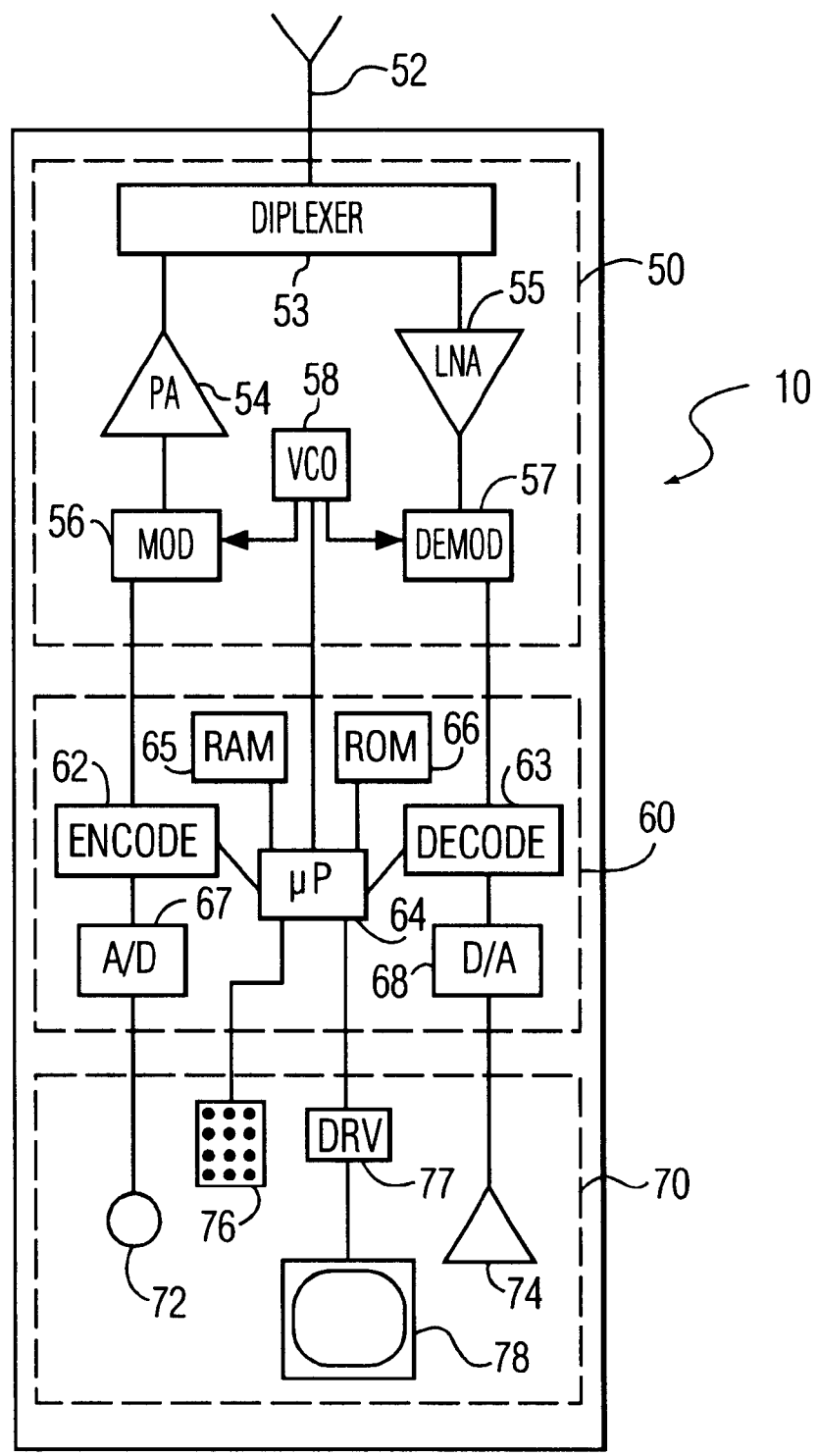
FIG. 2 is a general schematic diagram of the mobile station in FIG. 1.

Mobile station 10 is schematically shown in FIG. 2, which is also conventional at the level of detail shown. Therein, mobile station is seen to comprise an RF section 50, a baseband section 60, and a user interface section 70. RF section 50 comprises an antenna 52 coupled to a diplexer 53 which receives from the output of a power amplifier 54 an RF spread spectrum communication signal to be transmitted by antenna 52 and supplies an RF spread spectrum communication signal to the input of a low noise amplifier 55 which has been received by antenna 52. A modulator 56, preferably having a zero IF structure (not shown), receives a baseband spread spectrum communication signal from an encoder 62 of baseband section 60, and an RF carrier signal from voltage controlled oscillator or frequency synthesizer 58 and supplies an RF spread spectrum communication signal to the input of power amplifier 54. Similarly, demodulator 57, preferably also having a zero IF structure (not shown), receives an RF spread spectrum communication signal from the output of low noise amplifier 55 and an RF carrier signal from oscillator or synthesizer 58 and supplies a baseband spread spectrum communication signal to decoder 63 of baseband section 60. Generally, at least the encoder 62 and decoder 63 are implemented by a digital signal processor (not shown). In addition to encoding and decoding, encoder 62 and decoder 63 also perform spectrum spreading and despreading, respectively, in a well known manner by application of the relevant PN code sequence, at the relevant phase. Baseband section 60 also includes a microprocessor 64 which controls the frequency of oscillator or synthesizer 58, controls encoder 62 and decoder 63, and accesses a volatile random access memory unit 65 and a non-volatile read-only or memory unit 66, at least a part of which is programmable, e.g. an EEPROM (not shown) to contain firmware constituting the instructions used by microprocessor 64 to steer various events involved in the mobile station side of setup and maintenance of calls, including handovers. Also included in baseband section 60 is an analog to digital (A/D) converter 67 which feeds encoder 62 and is fed by a microphone 72 of user interface section 70, and a digital to analog converter 68 which is fed by decoder 63 and feeds a speaker 74 of user interface section 70.

In CDMA wireless cellular systems, in particular in accordance with standards under development for third generation (3G) systems, various transmission parameters for the downlink or forward link from the current base station 22 to mobile station 10 and for the uplink or reverse link from mobile station 10 to current base station. 22 can be adapted on a frame by frame basis by communication between the mobile station and the current base station. These parameters include transmission power and spreading factor. The latter is the ratio $R_{CHIP}/R_{INFO}$, where $R_{CHIP}$ is the chip rate of the Pseudo Noise (PN) spreading code, and $R_{INFO}$ is the symbol rate. Transmission power is normally adapted in a power control loop formed by interaction between the current base station and the mobile station in order to maintain signal quality. Transmission power is also adapted as the symbol rate and spreading factor are varied in a multi-rate service, since the transmit power may be reduced as the spreading factor is increased due to decrease of the symbol rate in order to improve the capacity of the CDMA system.

As previously mentioned, in accordance with the present invention the BER is significantly reduced during an inter-frequency handover in a CDMA system by increasing the spreading factor of transmissions to and from the mobile station during the handover, thereby reducing the occurrence of dropped calls during the handover, even in cases when it is not possible to further increase transmission power level.

Figure 3A:
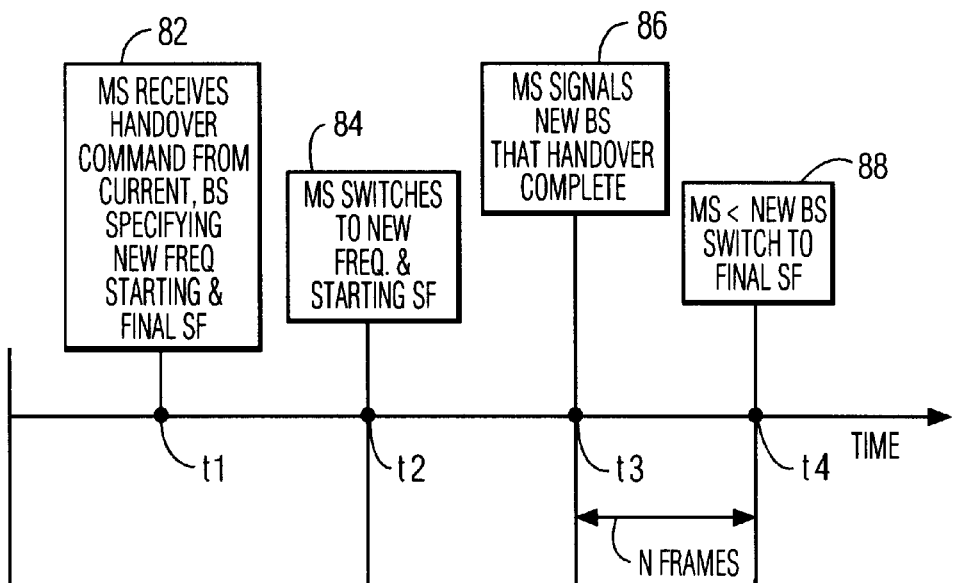
FIGS. 3a, 3b, and 3c are an aligned timeline of events, a graph of operating frequency versus time, and a graph of spreading factor (SF) versus time, respectively, in a time interval including an inter-frequency handover in accordance with the present invention.

A timeline of events when an inter-frequency handover is performed in accordance with the present invention is shown in FIG. 3A. Therein, an inter-frequency handover is commenced by an event 82 at time t1 in which current base station 22 sends a handover command (HANDOVER CMD) to mobile station (MS) 10 specifying a new frequency F2 for establishing forward and reverse links L2 with new base station 32, and a starting spreading factor (STARTING SF) and final spreading factor (FINAL SF) to be used. The inter-frequency handover decision is made in a conventional manner by base station controller 26 or network controller 28 in order to maintain an ongoing call with the mobile station 10. This decision is preceded by conventional periodic measurements by mobile station 10 of the quality or signal level of signals from current base station 22, from neighboring base stations of network 20 such as base station 24, and of neighboring base stations at other frequencies, such as base station 32 of network 30, which measurements are sent to current base station 22. This handover command is also communicated from network 20 to base station 32 of network 30 via network controller 38 and base station controller 36.

In order to substantially avoid dropped calls STARTING SF should be at least two times, and preferably at least four times FINAL SF. Thus, typical values for the starting and final spreading factors are 256 and 64, respectively.

Then, event 84 takes place at time t2 in which the mobile station 10 switches its transmit and receive frequencies to the new operating frequency F2, with the spreading factor for transmissions to and from mobile station 10 being switched to the starting spreading factor.

Once mobile station 10 demodulates correctly the signal from the new base station 32 at frequency F2, with spreading factor equal to STARTING SF, event 86 occurs, at time t3 in which mobile station 10 sends a signal to new base station 32 that the handover is complete (HANDOVER COM) and the message frame number (MessageFrameNumber) of the detected frame. Thereafter, at time t3, event 88 takes place wherein the spreading factor is switched to FINAL SF at both mobile station 10 and new base station 32 after a predetermined number n of frames following the transmitted message frame number. This predetermined number n is readily chosen by those skilled in the art without undue experimentation.

Figure 3B:
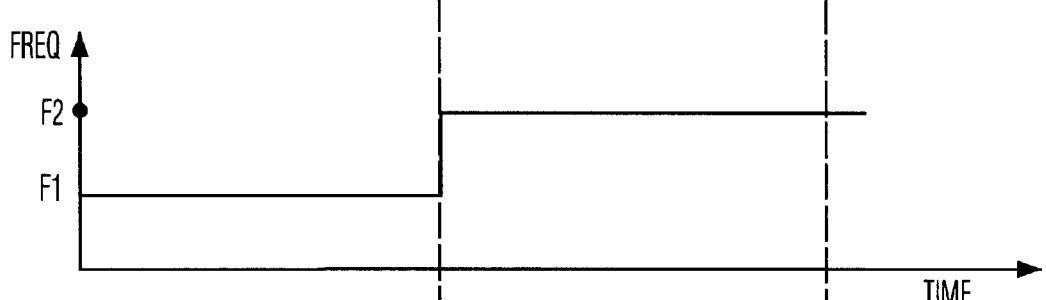

As shown in FIG. 3B, the operating frequency of mobile station 10 begins at F1, indicating it is in communication with base station 22, and at time t2 the operating frequency is switched to and remains at F2 to establish and maintain communication with base station 32.

Figure 3C:
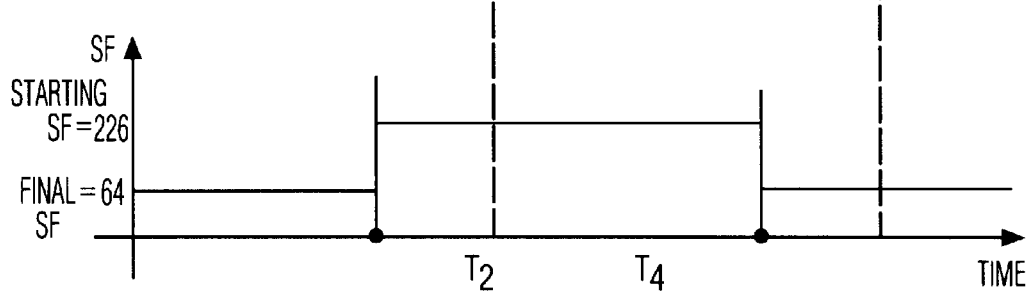

Further, as shown in FIG. 3C, the spreading factor SF begins at the final spreading factor while mobile station 10 is in communication with base station 22. Then at time t2 the spreading factor is increased to the starting spreading factor for the purpose of the inter-frequency handover, and at time t4 the spreading factor is subsequently returned to the final spreading factor after the inter-frequency handover has been accomplished.

It should now be appreciated that the objects of the present invention have been satisfied. While the present invention has been described in particular detail, it should also be appreciated that numerous modifications are possible within the intended spirit and scope of the invention. In interpreting the appended claims it should be understood that:

a) the word "comprising" does not exclude the presence of other elements or steps than those listed in a claim, b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A method for handover of a mobile station from current forward and reverse links with a base station of a wireless cellular system to new forward and reverse links utilizing a CDMA modulation type, which handover requires the mobile station to at least change its operating frequency, said method comprising the following acts performed at the mobile station in response to a handover command from the current base station identifying a new operating frequency, a final spreading factor, and a starting spreading factor which is at least double the final spreading factor:

switching operating frequency of the mobile station during a transient period in accordance with the identified new operating frequency;

establishing new forward and reverse links from the mobile station at the new operating frequency and the identified starting spreading factor by the end of the transient period; and communicating over the established new links at the identified final spreading factor after the end of the transient period.

2. The method as claimed in claim 1, wherein the starting spreading factor is at least four times the final spreading factor.

3. The method as claimed in claim 1, wherein the transient period ends after a predetermined number of frames following the establishment of the new link at the starting spreading factor.

4. A method for handover of a mobile station from current forward and reverse links with a base station of a wireless cellular system to new forward and reverse links utilizing a CDMA modulation type, which handover requires the mobile station to at least change its transmit and receive operating frequency, said method comprising transmitting from the base station to the mobile station during a transient period a handover command identifying a new operating frequency, a final spreading factor, and a starting spreading factor which is at least double the final spreading factor.

5. The method as claimed in claim 4, wherein the starting spreading factor is at least four times the final spreading factor.

6. Apparatus for handover of a mobile station from a current link with a base station of a wireless cellular system to a new link utilizing a CDMA modulation type, which handover requires the mobile station to at least change its operating frequency, said apparatus comprising:

a processor or controller at the mobile station programmed to steer the following events in response to receipt by the mobile station of a handover command from the base station identifying a new operating frequency, a final spreading factor, and a starting spreading factor which is at least double the final spreading factor;

switching the operating frequency of the mobile station during the transient period in accordance with the identified new operating frequency;

establishing a new link from the mobile station at the new operating frequency and the starting spreading factor by the end of the transient period; and communicating from the mobile station over the established new link at the identified final spreading factor after the end of the transient period.

7. The apparatus as claimed in claim 6, wherein the starting spreading factor is at least four times the final spreading factor.

8. The apparatus as claimed in claim 6, wherein the transient period ends after a predetermined number of frames following the establishment of the new link at the starting spreading factor.

* * * * *